United States Patent
Kuepfer

(10) Patent No.: US 12,441,303 B2
(45) Date of Patent: Oct. 14, 2025

(54) SYSTEMS AND METHOD FOR CONTROLLING DRIVER ASSISTANCE FEATURES OF A VEHICLE BASED ON IMAGES OF A ROAD SURFACE CONDITION

(71) Applicant: Bendix Commercial Vehicle Systems LLC, Avon, OH (US)

(72) Inventor: Cody D. Kuepfer, Westlake, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 351 days.

(21) Appl. No.: 18/072,217

(22) Filed: Nov. 30, 2022

(65) Prior Publication Data

US 2024/0174218 A1 May 30, 2024

(51) Int. Cl.
*B60W 30/09* (2012.01)
*B60W 30/14* (2006.01)
(Continued)

(52) U.S. Cl.
CPC ............ *B60W 30/09* (2013.01); *B60W 30/14* (2013.01); *B60W 60/001* (2020.02);
(Continued)

(58) Field of Classification Search
CPC .... B60W 30/09; B60W 30/14; B60W 60/001; G06V 20/588
See application file for complete search history.

(56) References Cited

U.S. PATENT DOCUMENTS 9,139,204 B1   9/2015   Zhao et al.
9,594,964 B2 *   3/2017   Zhao ...................... G06V 20/56
(Continued)

FOREIGN PATENT DOCUMENTS

CN   105172791   12/2015
DE   102018100117   7/2019
(Continued)

OTHER PUBLICATIONS

Juan Jesús Castillo Aguilar et al., "Robust Road Condition Detection System Using In-Vehicle Standard Sensors", Sensors 2015, 15, MDPI, pp. 32056-32078.
(Continued)

*Primary Examiner* — Luke Huynh
(74) *Attorney, Agent, or Firm* — Crowell & Moring LLP

(57) ABSTRACT

The present disclosure is directed to systems and methods for controlling driver assistance features of a vehicle based on images of a vehicle trajectory condition. In one form, the present disclosure provides a system comprising a memory, an imaging device positioned in a vehicle that is configured to generate images of a surface in front of the vehicle, and at least one processor configured to determine a vehicle trajectory condition based on images generated by the imaging device; when the vehicle trajectory condition is determined to be a first condition based on the images, operate a driver assistance system of the vehicle with a first set of feature cascades; and when the vehicle trajectory condition is determined to be a second condition based on the images, operate the driver assistance system of the vehicle with a second set of feature cascades.

16 Claims, 2 Drawing Sheets

(51) Int. Cl.
*B60W 60/00* (2020.01)
*G06V 20/56* (2022.01)

(52) U.S. Cl.
CPC ..... *G06V 20/588* (2022.01); *B60W 2420/403* (2013.01); *B60W 2510/18* (2013.01); *B60W 2552/05* (2020.02); *B60W 2552/40* (2020.02); *B60W 2555/20* (2020.02); *B60W 2710/18* (2013.01); *B60W 2720/10* (2013.01)

(56) References Cited

U.S. PATENT DOCUMENTS

| | | | |
|---|---|---|---|
| 10,147,002 B2 * | 12/2018 | Hartmann | G06T 3/40 |
| 10,549,734 B2 | 2/2020 | Hofmann et al. | |
| 11,772,641 B2 * | 10/2023 | Moshchuk | B60W 30/18163 |
| | | | 701/26 |
| 2019/0217864 A1 | 7/2019 | Kusukame et al. | |

FOREIGN PATENT DOCUMENTS

| | | |
|---|---|---|
| WO | 2020/195231 | 10/2020 |
| WO | 2021/159397 | 8/2021 |

OTHER PUBLICATIONS

Eldar Šabanovič et al. "Identification of Road-Surface Type Using Deep Neural Networks for Friction Coefficient Estimation", Sensors 2020, 20, 612, MDPI, pp. 1-17.

* cited by examiner

SYSTEMS AND METHOD FOR CONTROLLING DRIVER ASSISTANCE FEATURES OF A VEHICLE BASED ON IMAGES OF A ROAD SURFACE CONDITION

BACKGROUND

With conventional vehicle driver assistance systems, there is an assumption that the driver assistance system is only expected to perform in "perfect" road conditions such as dry asphalt. Therefore, when a vehicle operates on poor road conditions such as rain or snow, vehicle driver assistance systems often require driver intervention.

SUMMARY

The present disclosure addresses the above-described problem and provides systems and methods for controlling driver assistance features of a vehicle based on images of a vehicle trajectory condition, such a road in front of a vehicle. In particular, the present disclosure provides implementations in which an imaging device such as a camera positioned in a vehicle generates images of a vehicle trajectory, such as a road. A vehicle system, such as a drive assistance system, may utilize the images to determine a condition of the vehicle trajectory. When the vehicle system determines that the condition of the vehicle trajectory is not ideal, the vehicle system may adjust feature cascades of driver assistance features to compensate for the non-ideal conditions.

In one aspect, the present disclosure provides a system comprising a memory; an imaging device positioned in a vehicle that is configured to generate images of a surface in front of the vehicle; and at least one processor configured to execute instructions stored in the memory.

The at least one processor is further configured to determine a vehicle trajectory condition based on images generated by the imaging device. When the vehicle trajectory condition is determined to be a first condition based on the images, the at least one processor is configured to operate a driver assistance system of the vehicle with a first set of feature cascades. When the vehicle trajectory condition is determined to be a second condition based on the images, the at least one processor is configured to operate the driver assistance system of the vehicle with a second set of feature cascades, wherein the first set of feature cascades is different from the second set of feature cascades.

In another aspect, the present disclosure provides a method in which one or more processors determine a vehicle trajectory condition based on images of a surface in front of a vehicle that are generated by an imaging device positioned in the vehicle to generate images of the surface in front of the vehicle. When the vehicle trajectory condition is determined to be a first condition based on the images, the one or more processors operate a driver assistance system of the vehicle with a first set of feature cascades. When the vehicle trajectory condition is determined to be a second condition based on the images, the one or more processors operate the driver assistance system of the vehicle with a second set of feature cascades, wherein the first set of feature cascades is different from the second set of feature cascades.

DETAILED DESCRIPTION

The present disclosure is directed to systems and methods for controlling driver assistance features of a vehicle based on images of a vehicle trajectory condition, such as a road. As discussed below, the present disclosure provides implementations in which an imaging device such as a camera positioned in a vehicle generates images of a vehicle trajectory, such as a road. A vehicle system, such as a driver assistance system, may utilize the images to determine a condition of the vehicle trajectory. When the vehicle system determines that the condition of the vehicle trajectory is not ideal, the vehicle system may adjust feature cascades of driver assistance features to compensate for the non-ideal conditions.

Figure 1:
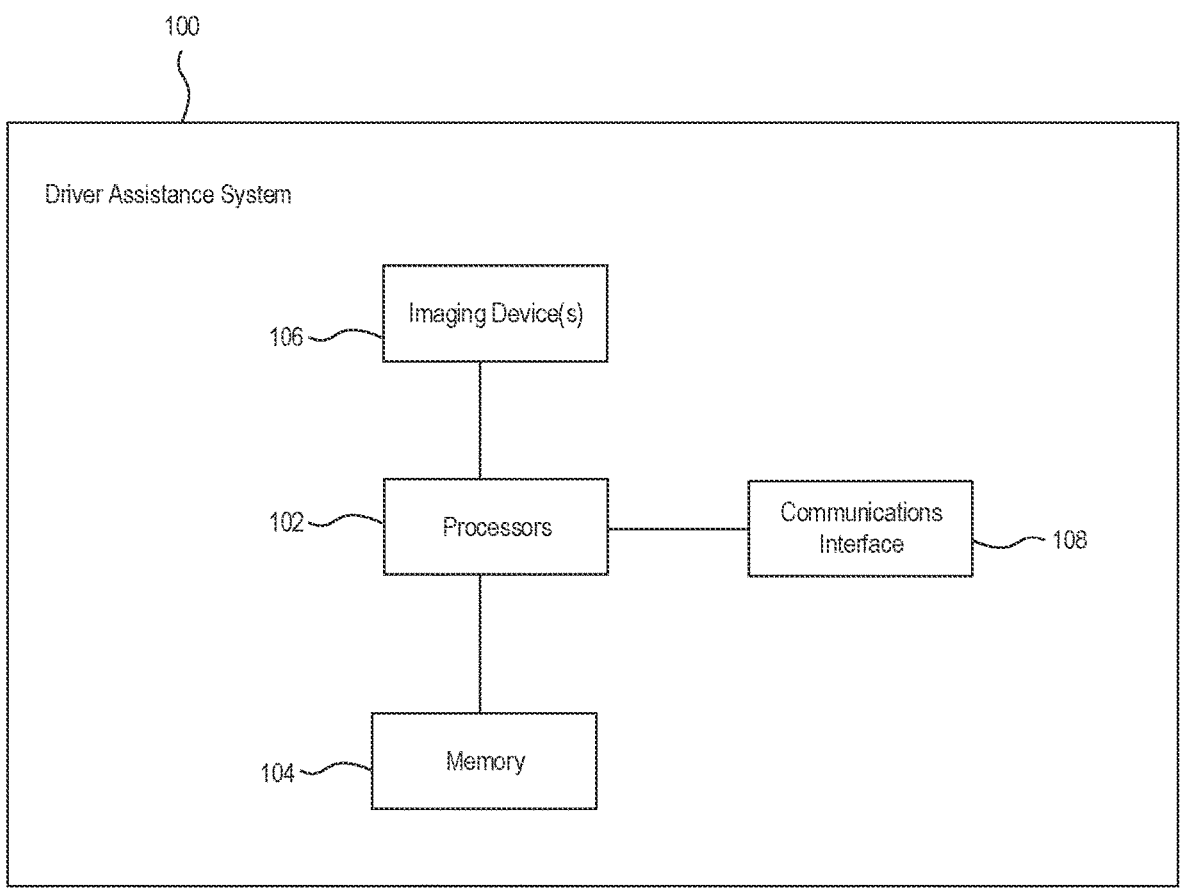
FIG. 1 is a block diagram of one form of a system for controlling driver assistance features of a vehicle based on images of a vehicle trajectory condition.

FIG. 1 is block diagram of one form of a system 100 for controlling driver assistance features of a vehicle based on images of a vehicle trajectory condition. In some implementations, the system 100 is integrated as part of a driver assistance system of the vehicle. However, in other implementations, the system 100 may be distinct from a driver assistance system, but configured to communicate with the driver assistance system to implement the actions described below. Additionally, in some implementations, the vehicle may be an autonomous vehicle where driver assistance systems are configured to operate without human intervention.

In the illustrative example of FIG. 1, the system 100 for controlling driver assistance features of a vehicle is integrated with a driver assistance system. In some implementations, the driver assistance system may provide features such as adaptive cruise control, automated emergency braking, a following distance alert, and/or lane centering assist. However, the driver assistance may provide additional driver assistance features.

The system includes one or more processors 102, a memory 104, one or more imaging device 106 and a communication interface 108. The one or more processors 102 are in communication with the memory 104 and are configured to execute instructions stored in the memory 104. The processor 102 may be a controller, a central processing unit, or any other type of electronic circuitry able to execute instructions stored in the memory 104.

The one or more imaging devices 106 are in communication with the processor 102 and are configured to generate images of a trajectory of the vehicle, such as a road or other surface in front of a vehicle. In some implementations, the one or more imaging devices 106 may be forward-facing cameras. However, other types of imaging devices may be utilized capable of generating vehicle trajectory/road information that the processor may analyze to determine a condition of the trajectory of the vehicle.

The communication interface 108 provides an interface through which the system 100 communicate with other vehicle systems such as other driver assistance systems; braking systems; steering systems; navigation systems; display/audio systems of the vehicle; and/or a mobile device of a driver, such as a phone or tablet. The communication interface may additionally provide communications to systems external to the vehicle such as servers of a fleet control system.

Figure 2:
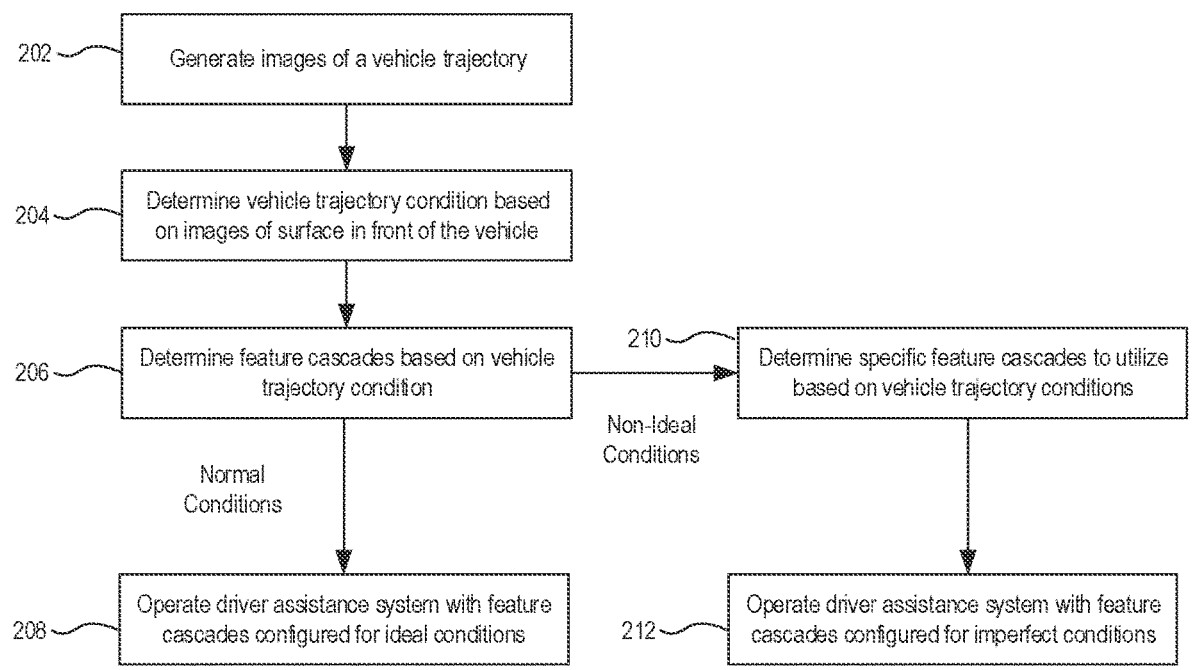
FIG. 2 is a flow chart of one form of a method for controlling driver assistance features of a vehicle based on images of a vehicle trajectory condition.

FIG. 2 is a flow chart of one form of a method for controlling driver assistance features of a vehicle based on images of a vehicle trajectory condition. In some implementations, the following method may be performed with a system positioned in a vehicle such as the system described above in conjunction with FIG. 1.

At step 202, an imaging device positioned in a vehicle generates images of a surface in a trajectory of the vehicle, such as a road in front of the vehicle. In some implementations, the imaging device is a camera. However other types of imaging devices that that are configured to generate images or other types of information of a surface in a trajectory of the vehicle may be used.

At step 204, a processor of the vehicle determines a vehicle trajectory condition, such as a condition of a road, based on the images generated by the imaging device at step 202. In some implementations, the processor is able to determine the vehicle trajectory condition utilizing a data model stored in memory of the vehicle that has been generated through the use of training algorithms and machine learning to teach the system to be able to identify properties of surfaces in images. For example, the processor may be configured to identify surface conditions in images such as wet or dry asphalt, wet or dry dirt, wet or dry gravel, snow, ice, or any other type of surface on which a vehicle may travel.

In some implementations, at step 204, the processor may determine that the vehicle trajectory condition is a first condition, such as a normal condition, when the images of the vehicle trajectory indicate that the vehicle is traveling on a road such as dry asphalt. Alternatively, the processor may determine that the vehicle trajectory condition is in a second condition, such as an imperfect condition, when the images of the vehicle trajectory indicate that the road or other surface on which the vehicle is traveling is at least one of dry dirt, wet asphalt, gravel, wet dirt, snow, or ice, for example.

At step 206, the processor determines, based on the determined vehicle trajectory condition at step 204, whether a driver assistance system should utilize feature cascades for a first condition, such as normal road conditions, or should utilize features cascades for a second condition, such as imperfect conditions. In some implementations, the driver assistance system of the vehicle includes at least one of an adaptive cruise control, an automatic emergency braking system, or a following distance alerting system. A feature cascade is a set of values utilized by a driver assistance system to safely control a vehicle during operation. In some implementations, a feature cascade may include values representing a follow time in an adaptive cruise control system, a time before collision to implement automated emergency braking systems, and/or a time before collision to implement a forward distance alert.

For example, when the processor determines that the vehicle trajectory condition is a normal condition, at step 208, the processor operates the driver assistance system of the vehicle with a set of feature cascades that have been configured for ideal conditions.

However, when the processor determines that the vehicle trajectory condition is imperfect due to at least one of dry dirt, wet asphalt, gravel, wet dirt, snow, or ice, for example, at step 210, the processor determines a specific set of features cascades to utilize based on the vehicle trajectory conditions. At step 212, the processor then operates the driver assistance system of the vehicle with the set of feature cascades that has been configured for imperfect conditions.

In some implementations, the processor may obtain the set of features cascades for use with the driver assistance system in imperfect conditions from a table of predetermined values stored in memory at the vehicle. Table 1 is an exemplary table of feature cascades.

TABLE 1

| Surface | Feature Activation Time (Seconds) | | | | |
|---|---|---|---|---|---|
| | ACC | AEB | FDA 1 | FDA 2 | FDA 3 |
| Dry Asphalt (mu = 0.85) | 3.00 | 2.50 | 1.50 | 1.00 | 0.50 |
| Dry Dirt (mu = 0.68) | 3.75 | 3.13 | 1.69 | 1.13 | 0.56 |
| Wet Asphalt (mu = 0.60) | 4.25 | 3.54 | 1.91 | 1.28 | 0.64 |
| Gravel (mu = 0.60) | 4.25 | 3.54 | 1.91 | 1.28 | 0.64 |
| Wet Dirt (mu = 0.55) | 4.64 | 3.86 | 2.09 | 1.39 | 0.70 |
| Snow (mu = 0.20) | 12.75 | 10.63 | 5.74 | 3.83 | 1.91 |
| Ice (mu = 0.10) | 25.50 | 21.25 | 11.48 | 7.65 | 3.83 |

In Table 1, a friction coefficient (mu) is listed for each enumerated surface. Generally, a friction coefficient is a measure of an amount of friction existing between two surfaces and is represented as a ratio between a friction force and a normal force, as known to those of skill in the art.

In Table 1, ACC stands for Adaptive Cruise Control, AEB stands for Automated Emergency Braking, and FDA stands for Following Distance Alert. The values within the chart indicate a time in seconds before a driver assistance system activates.

For example, for Adaptive Cruise Control, on dry asphalt with a friction coefficient of 0.85, when in ACC and a host vehicle is following a forward target, if a following distance in seconds falls under 3 seconds, the ACC will activate, thereby causing the host vehicle to back off the forward target to increase the following distance and maintain the follow distance in seconds of 3 seconds. Similarly, on wet asphalt with a friction coefficient of 0.60, when in ACC and a host vehicle is following a forward target, if a following distance in seconds falls under 4.25 seconds, the ACC will activate, thereby causing the host vehicle to back off the forward target to increase the following distance and maintain the follow distance in seconds of 4.25 seconds.

In another example, for Automated Emergency Braking, on dry asphalt with a friction coefficient of 0.85, when a calculated time to collision reaches 2.5 seconds, the AEB will activate, warning the driver and eventually applying the brakes. Similarly, on wet asphalt with a friction coefficient of 0.60, when a calculated time to collision reaches 3.54 seconds, the AEB will activate, warning the driver and eventually applying the brakes.

In yet another example, for Following Distance Alerts, on dry asphalt with a friction coefficient of 0.85, when a host vehicle is following a forward target (with the ACC off) and a following distance in seconds is under 1.5 seconds, FDA Level 1 will alert the driver of the close following distance. Similarly, on wet asphalt with a friction coefficient of 0.60, when a host vehicle is following a forward target (with the ACC off) and a following distance in seconds is under 1.91 seconds, FDA Level 1 will alert the driver of the close following distance.

Further, on dry asphalt with a friction coefficient of 0.85, when a host vehicle is following a forward target (with the ACC off) and a following distance in seconds is under 1.0 seconds, FDA Level 2 will alert the driver of the close following distance. Similarly, on wet asphalt with a friction coefficient of 0.60, when a host vehicle is following a forward target (ACC off) and a following distance in seconds is under 1.28 seconds, FDA Level 2 will alert the driver of the close following distance.

Additionally, on dry asphalt with a friction coefficient of 0.85, when a host vehicle is following a forward target (with the ACC off) and a following distance in seconds is under 0.5 seconds, FDA Level 3 will alert the driver of the close following distance. Similarly, on wet asphalt with a friction coefficient of 0.60, when the host vehicle is following a forward target (with the ACC off) and the following distance in seconds is 0.64 seconds, FDA Level 3 will alert the driver of the close following distance.

In other implementations, the processor may determine a set of feature cascades to use in imperfect conditions based on information from other vehicle systems, such as a braking controller. For example, the processor may determine a friction coefficient of a surface such as a road based on the images of the road and vehicle braking information, and then utilize the friction coefficient to modify one or more feature cascades for use with driver assistance systems. In some implementations, the processor may modify one or more feature cascades utilized by driver assistance systems in normal conditions based on the determined friction coefficient.

In some implementations, to obtain vehicle braking information, the processor may communicate with vehicle braking systems, such as an antilock braking controller, to measure how much the vehicle is decelerated with a brake application at the vehicle.

In one illustrative example, the driver assistance system comprises an adaptive cruise control, and as part of modifying one or more feature cascades utilized in ideal conditions when images indicate imperfect conditions, the processor adjusts a follow distance of the adaptive cruise control based on the determined friction coefficient of the road. For example, as a fiction coefficient decreases, the processor may modify one or more feature cascades utilized in ideal conditions for the adaptive cruise control to increase a follow distance in relation to a follow distance during ideal road conditions, thereby providing the vehicle more time to stop.

In another illustrative example, the driver assistance system comprises an automatic emergency braking system, and as part of modifying one or more feature cascades utilized in ideal conditions when images indicate imperfect conditions, the processor adjusts a calculated time to collision for the automatic emergency braking system based on the determined friction of coefficient of the road. For example, as a friction coefficient decreases, the processor may modify one or more feature cascades utilized in ideal conditions for the automatic emergency braking system to increase the calculated time to collision in relation to a calculated time to collision during ideal road conditions, thereby allowing the vehicle to engage an automatic braking system sooner before a collision.

In yet another illustrative example, the driver assistance system comprises a following distance alert system, and as part of modifying one or more feature cascades utilized in ideal conditions when images indicate imperfect conditions, the processor adjusts a threshold in the following distance alert system at which an alert is generated and displayed to the driver regarding the following distance. For example, as a friction coefficient decreases, the processor may adjust the threshold in relation to a threshold during ideal road conditions to allow the flow distance alert system to alert the driver earlier.

FIGS. 1 and 2 and their accompanying descriptions teach systems and methods for controlling driver assistance features of a vehicle based on images of a vehicle trajectory condition, such as a road surface condition. As discussed above, the present disclosure provides implementations in which an imaging device such as a camera positioned in a vehicle generates images of a vehicle trajectory, such as a road. The vehicle system may utilize the images to determine a condition of the vehicle trajectory. When the vehicle system determines that the condition of the vehicle trajectory is not ideal, the vehicle system may adjust feature cascades of driver assistance systems to compensate for the non-ideal conditions.

The foregoing disclosure has been set forth to illustrate the invention and is not intended to be limiting. Since modifications of the disclosed form and implementations incorporating the spirit and substance of the invention may occur to persons skilled in the art, the invention should be construed to include everything within the scope of the appended claims and equivalents thereof.

The invention claimed is:

1. A system comprising:
a memory;
an imaging device positioned in a vehicle that is configured to generate images of a surface in front of the vehicle; and
at least one processor configured to execute instructions stored in the memory and to:
determine a vehicle trajectory condition based on images of the surface in front of the vehicle generated by the imaging device;
when the vehicle trajectory condition is determined to be a first condition based on the images, operate a driver assistance system of the vehicle with a first set of feature cascades, where the at least one processor is configured to determine that the vehicle trajectory condition is the first condition when the images of the surface in front of the vehicle indicate that the surface is dry asphalt; and
when the vehicle trajectory condition is determined to be a second condition based on the images, operate the driver assistance system of the vehicle with a second set of feature cascades, wherein the first set of feature cascades is different from the second set of feature cascades, wherein the at least one processor is configured to determine that the vehicle trajectory condition is the second condition when the images of the surface in front of the vehicle indicate that the surface is at least one of dry dirt, wet asphalt, gravel, wet dirt, snow, or ice;
wherein when the at least one processor determines that the vehicle trajectory condition is the second condition, the at least one processor is further configured to:
determine a friction coefficient of the surface based on the images and vehicle braking information; and
modify one or more feature cascades based on the determined friction coefficient of the surface.

2. The system of claim 1, wherein the driver assistance system comprises at least one of an adaptive cruise control, an automatic emergency braking system, or a following distance alerting system.

3. The system of claim 1, wherein the braking information is based on a measurement of how much the vehicle is decelerated with a brake application at the vehicle.

4. The system of claim 1, wherein:
the driver assistance system comprises an adaptive cruise control; and
to modify one or more feature cascades, the processor is configured to adjust a follow distance of the adaptive cruise control based on the determined friction coefficient.

5. The system of claim 1, wherein:
the driver assistance system comprises an automatic emergency braking system; and
to modify one or more feature cascades, the processor is configured to adjust a calculated time to collision for the automatic emergency braking system based on the determined friction of coefficient.

6. The system of claim 1, wherein:
the driver assistance system comprises a following distance alert system; and
to modify one or more feature cascades, the processor is configured to adjust a threshold in the following distance alert system at which the processor provides an alert to a driver regarding the following distance.

7. The system of claim 1, wherein the imaging device comprises a forward-facing camera.

8. The system of claim 1, wherein the vehicle is an autonomous vehicle.

9. A method, comprising:
determine, with one or more processors, a vehicle trajectory condition based on images of a surface in front of a vehicle that are generated by an imaging device positioned in the vehicle to generate images of the surface in front of the vehicle;
when the vehicle trajectory condition is determined to be a first condition based on the images, operate, with the one or more processors, a driver assistance system of the vehicle with a first set of feature cascades, where the one or more processors determine that the vehicle trajectory condition is the first condition when the images of the surface in front of the vehicle indicate that the surface is dry asphalt; and
when the vehicle trajectory condition is determined to be a second condition based on the images, operate, with the one or more processors, the driver assistance system of the vehicle with a second set of feature cascades, wherein the first set of feature cascades is different from the second set of feature cascades, wherein the one or more processor determine that the vehicle trajectory condition is the second condition when the images of the surface in front of the vehicle indicate that the surface is at least one of dry dirt, wet asphalt, gravel, wet dirt, snow, or ice;
wherein when the one or more processors determine that the vehicle trajectory condition is the second condition, the one or more processors further:
determine a friction coefficient of the surface based on the images and vehicle braking information; and
modify one or more feature cascades based on the determined friction coefficient of the surface.

10. The method of claim 9, wherein the driver assistance system comprises at least one of an adaptive cruise control, an automatic emergency braking system, or a following distance alerting system.

11. The method of claim 9, wherein the braking information is based on a measurement of how much a vehicle is decelerated with a brake application at the vehicle.

12. The method of claim 9, wherein:
the driver assistance system comprises an adaptive cruise control; and
modifying one or more feature cascades comprises adjusting, with the one or more processors, a follow distance of the adaptive cruise control based on the determined friction coefficient.

13. The method of claim 9, wherein:
the driver assistance system comprises an automatic emergency braking system; and
modify one or more feature cascades comprises adjusting, with the one or more processors, a calculated time to collision for the automatic emergency braking system based on the determined friction of coefficient.

14. The method of claim 9, wherein:
the driver assistance system comprises a following distance alert system; and
modifying one or more feature cascades comprises adjusting, with the one or more processors, a threshold in the following distance alert system at which an alert is generated and displayed to a driver regarding the following distance.

15. The method of claim 9, wherein the imaging device comprises a forward-facing camera.

16. The method of claim 9, wherein the vehicle is an autonomous vehicle.

* * * * *